Jan. 7, 1930.  W. H. McFARLAND  1,742,315
TIRE MOUNTING AND DISMOUNTING DEVICE
Filed March 31, 1928  2 Sheets-Sheet 1
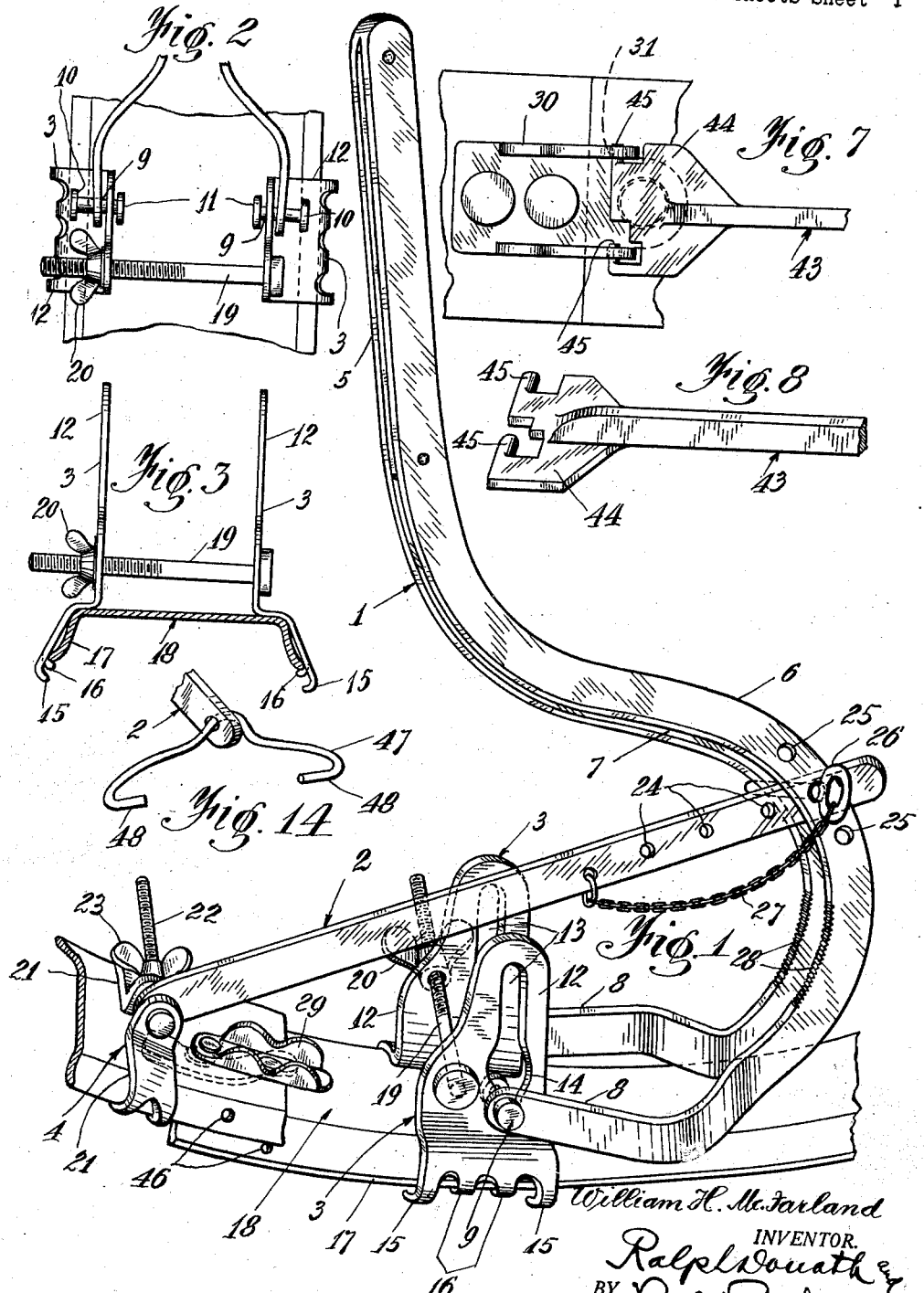
William H. McFarland
INVENTOR.
BY Ralph Douath
Paul Purchard
ATTORNEYS.

Jan. 7, 1930.  W. H. McFARLAND  1,742,315
TIRE MOUNTING AND DISMOUNTING DEVICE
Filed March 31, 1928   2 Sheets-Sheet 2
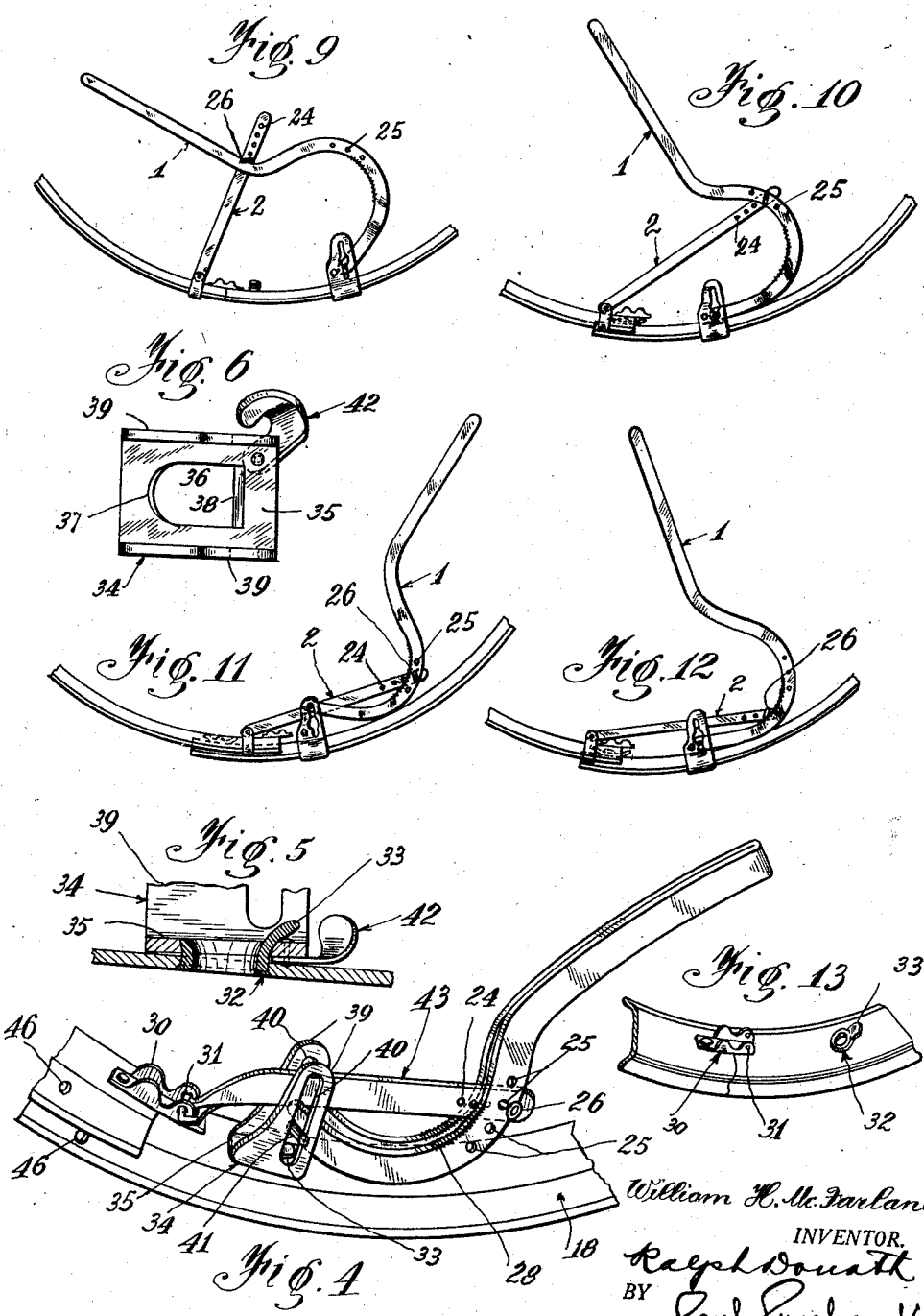

Patented Jan. 7, 1930

1,742,315

UNITED STATES PATENT OFFICE

WILLIAM H. McFARLAND, OF PITTSBURGH, PENNSYLVANIA

TIRE MOUNTING AND DISMOUNTING DEVICE

Application filed March 31, 1928. Serial No. 266,141.

This invention relates to devices for mounting or removing pneumatic tires used in connection with split-rims.

The primary object of this invention is to provide a tire mounting or removing device adapted to be used on all commercial split rims now in use. Another object is to provide such a device which is adapted to lift one end of a split rim above the other end prior to overlapping said ends for constricting the rim the amount required for either mounting or dismounting a tire. A further object is to provide a device in which the various pulling operations for constricting a rim and the pushing operations for forcing a constricted rim back into normal position, are all performed under most favorable conditions whereby friction of the constricted end of the rim on the stationary end thereof will be greatly reduced, if not completely prevented. Yet another object is the provision of such a device which is light in weight, relatively small, which is quickly applicable to a split-rim and which is self locking when the split-rim has been constricted to the full amount required.

Additional features and advantages of this invention will appear from the following description considered in connection with the appended drawings forming a part of this application.

In the drawings:

Fig. 1 is a fragmentary perspective view showing the universal type of my device in position ready to begin the forceful constriction of a split-rim.

Fig. 2 is a fragmentary illustration showing especially a top plan view of the anchoring device used in Fig. 1.

Fig. 3 is an end view of said anchoring device, split-rim being shown in cross-section.

Fig. 4 is a fragmentary perspective view showing a split-rim in an intermediate state of constriction by means of a modified construction of my rim-tool.

Fig. 5 is a section taken through the valve stem collar of a certain type of split-rim.

Fig. 6 is a top plan view of an anchoring device used in connection with split-rims having valve-stem collars as shown in Fig. 5.

Fig. 7 is a fractional plan view of a rim taken at the split showing a special type of rim-lock and the method of hooking the draw and thrust bar of the device thereon.

Fig. 8 is a perspective view of the hook end of the draw and thrust bar used in Fig. 7.

Figs. 9, 10, 11 and 12 are diagrammatic views showing various stages in the operation of my device.

Fig. 13 is a fragmentary perspective view of a split-rim having a valve-stem-collar of the type shown in Figs. 4 and 5.

Fig. 14 is a fragmentary view showing a draw and thrust bar provided with a bail adapted to be hooked on a certain type of rim.

A universal rim-tool constructed in the manner shown in Figs. 1 to 3, in particular, consists in the main of the operating lever 1, the draw and thrust bar 2, the anchoring device 3 of the lever and the rim-clamp 4 for the draw-bar. The operating lever comprises a substantially straight handle 5 and a curved body-portion 6. This lever is preferably made of two symmetrically bent halves which are riveted together at the top to form the handle and which are spread outwardly to produce a narrow slot 7, having substantially parallel sides, and in which may be inserted the draw-bar. The lower ends of said halves are spread still further apart and form the feet 8 of the operating lever, which are angularly disposed in relation to the curved body-portion. At the outer ends of the feet are medially secured the transverse pins 9 having heads 10 and 11 and which form the fulcrums of the lever.

The anchoring means for the lever is a clamping device composed of two similar halves 12, each having in the upper part an elongated slot 13 in which the fulcrum pins may slide freely. An enlargement 14 is provided in each slot to admit either head 10 or 11. Thus, the lever may be applied either between or outside the clamp sides to suit the varying widths of the rims to be manipulated. The lower end of each clamp-half is bent to produce the jaw of the clamp which is adapted to bear on the inner circumference of the rim and which has also prongs 15 and 16, adapted to engage the outer periphery of the curl 17 of the rim 18. The outer prongs 15 are longer than the inner prongs, the former being intended for wide rims with deep curls or flanges and the latter for rims having shallow curls. These anchor clamps are made fast on the "dead" end of a rim by means of the cross-bolt 19 and the wing-nut 20.

The draw-bar 2 is "hooked" onto the "live" end of the split-rim by means of the adjustable clamp 4, formed of two identical halves 21 clamped to the rim by the bolt 22 and wing-nut 23. The draw-bar has at the lower end an aperture, (not visible) which is engaged freely by the bolt 22, thus forming a pivotal connection between the clamp 21 and the draw-bar 2. The latter has at its upper or outer end a series of apertures 24 which may be brought into alignment with similar registering apertures 25 provided in both halves of the operating lever. The rigid draw-bar is pivotally connected to the operating lever by means of the removable thole-pin 26. If desired, the latter may be attached to the lever or the draw-bar by means of a chain 27 to prevent its loss. The lower inside edges of the operating lever, have corrugations or serrations 28, the purpose of which will be explained later. In the split-rim shown in Fig. 1 the stationary rim-lock 29 is riveted on the "live" end of the rim and the latch for said lock is pivotally mounted on the "dead" end of the rim. The latch is shown in dotted lines owing to the overlapping of the rim-ends.

As will be explained hereafter and as shown in Fig. 11, when the "live" end of the rim is being constricted, the fulcrum-pins 9 move upwardly in the guide-slots 13. The eccentric force acting upon the clamp tends to twist or turn it around a counterclockwise direction; this causes the forward edges of the jaws to dig into the inner surface of the rim and the upper edges of the rear prongs to exert a great pressure on the outer circumference of the rim-curl, therefore, the greater the resistance to constriction, the more will any tendency of the clamps to slide along the rim be counter-acted, and the proper securement of the clamps on the rim does not depend solely on the direct pressure exerted by means of the wing nut 20. In fact, because of this torsional action, the clamps may be secured on the rim by hand without requiring any wrenches to tighten the wing nut.

The modified construction of my rim-tool shown in Fig. 4 in particular, is intended for split-rims having a rim-lock 30 provided with holes 31 in the end lugs and also provided with a valve-stem-collar 32 having a radial, slightly inclined, hooked and substantially rectangular tab 33. The anchoring means for the operating lever consists in this case of a U-shaped shoe 34 having a flat bottom 35 in which is provided an opening 36, having a semi-circular end 37 and opposite thereto a straight end 38. This opening is large enough to be engaged by the valve-stem-collar, the straight end of the opening fitting under the tab of said collar. The portion of the latter protruding above the inside of the rim is generally flared outwardly a little and, to insure a better hold of the shoe 34 on the collar, the rounded and straight ends of the opening 36 are preferably bevelled, as shown in Figs. 5 and 6. Each side 39 of the shoe has an elongated slot 40 which slidably receives the corresponding fulcrum pin of the operating lever. The construction of the latter has also been slightly modified in that the fulcrum pins are formed integrally with the lever by splitting the forward ends of the feet thereof and bending and rounding off one of the spit ends outwardly to form the fulcrum pin 41, as indicated in Fig. 4.

To further insure a good hold of the shoe about the valve-stem-collar I provide at the underside of the bottom 35 a horizontally pivoted, flat and wedge-shaped latch 42 which is forced between the tire-rim and the shoe after the latter has been placed about the valve-stem-collar.

The draw-bar 43 used in connection with the type of rim-lock 30, shown in Figs. 4 and 13, has at the forward end a flat portion 44 in which are cut the two similarly directed hook-on pins 45. The other parts of this modified rim-tool being substantially similar to the ones described in connection with the universal rim-tool, have been identified with the same numerals.

Aside from the types of locks described, several makes of rims have in the curl portion and adjacent the split oppositely disposed apertures 46 as shown in Figs. 1 and 4. In such cases, if desired, the hook-on device for the draw-bar may be simplified by providing at the inner end of the latter a bail 47 having inwardly directed prongs 48 (see Fig. 14). This bail may be readily applied to the live end of the rim, by first fully inserting one prong into the first aperture and then engaging the second aperture with the other prong, as will be readily understood.

From the foregoing description, the operation of my rim-tool will be easily understood and may be succinctly explained as follows: The anchoring device for the operating lever is first secured at the proper distance from the rim-split on the "dead" end of the rim to permit constriction for the requisite distance, and the hook-on device of the draw-bar as near the split as convenient. The initial task being to "break" the rim, the draw-bar is placed between the two halves of the operating lever and the thole pin 26 is inserted in the convenient aperture 24 at the outer end of the draw-bar, so that said pin will bear on the outer edge of the operating lever, substantially at the place shown in Fig. 9, the principle being to have the draw-bar as nearly radially disposed as possible, in order to obtain a substantially direct pull at the split. A quick jerk exerted on the lever-handle causes the "live" end of the rim to rise above the "dead" end and the inherent spring in the rim will force said "live" end into slight overlapping position on the "dead" end, as shown in Figs. 1 or 10.

Constriction of the rim comes next, and since the force required to perform it increases with the amount of constriction, it is evident that a readjustment of the rim-tool for more power is desirable. The draw-bar is, therefore, swung over nearly half way around the curve of the lever and pivotally secured thereat by inserting the thole pin through the convenient registering apertures 25 and 24 provided respectively in the lever and draw-bar. The leverage ratio is therefore increased.

With the operating lever and draw-bar occupying the positions substantially as shown in Fig. 10 and the thole pin at the new load-point making a firm pivotal connection between the first two parts of the rim-tool, the "live" end of the rim may now be pulled over. As the lever handle is rotated clockwise, the leverage-ratio continues to increase. The action of the lever is somewhat complex since, all the three lever-points moving, swing into new relation to the load; but as the load point is carried down nearer to the rim, the lower portion of the curved lever-body bearing against the flat inner surface of the rim, throws the fulcrum-pins of the lever upward along the slots in the lever anchoring means.

When the fulcrum-pins of the lever are in line with the line of pull passing through the two points of attachment of the draw-bar, a condition of unstable equilibrium is obtained, so that a slight pressure on the lever arm will balance the strong tendency to recoil of the steel rim. By dropping the operating handle a fraction of an inch further, the fulcrum pins will lie above the line of pull, and the stronger the recoil of the "live" end of the rim, the more firmly will the rim be locked into constricted position.

When the rim is ready to be closed, the lever has still a third point for transmitting power, and the draw-bar is transformed into a thrust-bar for the closing operation. Lifting the operating lever past the dead center, the operator finds that the natural recoil of the split rim carries the "live" end thereof back to within an inch of, or closer to, the normal closed position. The thole pin may now be easily pulled out, this causes the free end of the thrust-bar to drop onto the inner surface of the rim, said bar assuming a nearly horizontal position, as illustrated in Fig. 12.

Now, with the fulcrum-pins of the operating lever at the bottom of the guide-slots in the anchoring means, close to the inner surface of the rim, the thole-pin is inserted into one of the holes of the thrust-bar as near as possible to the inner contour of the curved portion of the lever. Then, by moving the lever handle counter-clockwise, the thrust-bar will force the "live" end of the rim into abutting position with the "dead" end of the rim, thus closing the rim. Owing to the substantially horizontal position assumed by the thrust-bar, much less power will be required to force the "live" end home than is needed in other devices of similar purpose, where the thrust-bar operates obliquely at a high angle, because the thrust in my device is direct and friction due to the "live" end pressing on the "dead" end of the rim is practically eliminated.

To insure against sliding of the thole-pin as the lever is reversed, the inner curve of the lever is preferably provided with serrations 28, mentioned heretofore, or may be roughened in any suitable manner. Of course, if desired, instead of these serrations the lever and the thrust-bar could be provided with additional apertures to be engaged by the thole-pin, but the serrations have been found preferable because they expedite the closing operation of the rim.

It will be understood, of course, that the arrangements I have herein shown and tried in actual use are merely suggestive of many arrangements that might be adopted in carrying out my invention, and I do not wish to be limited to the construction illustrated otherwise than as specified in the appended claims.

I claim:—

1. In a device for mounting and dismounting a tire on or off a split-rim, an operating lever comprising a handle and a curved body portion; fulcrum pins positioned on said curved body portion, anchoring means adapted to be engaged by the fulcrum-pins; means for securing said anchoring means to the stationary or dead end of said split-rim; a rigid draw-bar, means for rockably connecting the same to the live end of the rim, and means for connecting the other end of the draw-bar to the operating lever at selective points thereon.

2. In a device for mounting and dismounting a tire on or off a split-rim, an operating lever comprising a substantially straight handle and a curved body portion adapted to engage the inner surface of the rim, fulcrum pins positioned on said curved body portion, anchoring means for supporting the fulcrum-pins, means positioned in the anchoring means adapted to guide the fulcrum-pins for substantially radial movement relative to the rim, means for securing the anchoring means to the stationary or dead end of the split-rim; a rigid draw-bar, means for rockably connecting the same to the live end of the rim, and means for connecting the other end of the draw-bar to the operating lever at selective points thereon.

3. In a device for mounting and dismounting a tire on or off a split-rim, an operating lever comprising a substantially straight handle and a curved body portion adapted to engage the inner surface of the rim; fulcrum-pins positioned on said curved body portion; anchoring means for the operating lever having elongated slots engaged by said fulcrum pins and guiding the same for substantially radial sliding movement relative to the rim; a rigid draw-bar; means for rockably connecting the same to the live end of the rim and means for connecting the other end of the draw-bar at selective points on the operating lever to vary the leverage ratio thereof.

4. In a device for mounting and dismounting a tire on or off a split-rim, an operating lever comprising a handle and a curved body portion adapted to engage the inner surface of the rim, said lever having also a plurality of apertures disposed in spaced longitudinal relation thereon, fulcrum-pins positioned on said curved body portion, anchoring means for rockably supporting the operating lever; means for securing said anchoring means to the stationary or dead end of the rim; a rigid draw and thrust bar, means for rockably connecting one end thereof to the live end of the rim; the other end of the draw-bar having apertures adapted to register with apertures positioned on the operating lever, and fastening means insertable through registering apertures in the lever and draw-bar for pivotally connecting said draw-bar to the lever.

In testimony whereof I affix my signature.

WILLIAM H. McFARLAND.